UNITED STATES PATENT OFFICE.

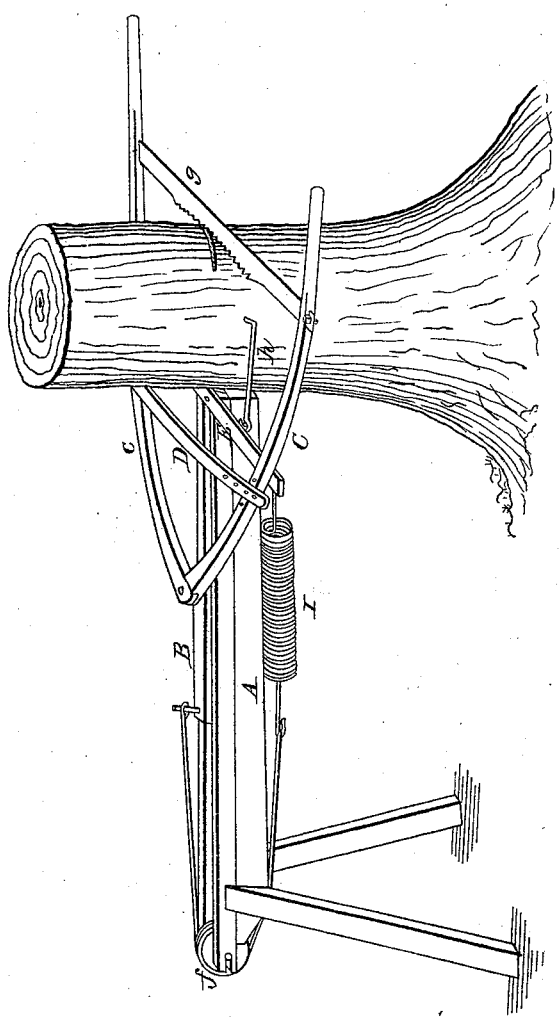

EBENEZER MATHERS, OF MORGANTOWN, VIRGINIA.

MACHINE FOR FELLING TREES.

Specification of Letters Patent No. 14,462, dated March 18, 1856.

*To all whom it may concern:*

Be it known that I, EBENEZER MATHERS, of the town of Morgantown, county of Monongalia, and State of Virginia, have invented a new and useful Machine for Cutting Down Timber-Trees; and I do hereby declare that the following is a full, clear, and exact description of the construction and operation of the same, reference being had to the annexed drawing, making a part of this specification, with letters of reference marked thereon.

A, a trestle say 6 or 8 feet long, made of wood, at the back end supported by legs, at the other end a stout dowel pin, which is to be driven into the tree; B, a block which rests upon the trestle, confined between two guide pieces placed upon the trestle, but so that the block B may slide back or forward between the guides; near one end of this block is a pin standing up, which serves as a fulcrum for the saw frame to turn on; near the other end is a pin or hook, to which is attached a strap which passes over the pulley $f$ to the spiral spring $i$ underneath; C, C, two curved arms, made of hickory or some strong elastic material; D, a stiff bar placed across the arms C, fastened by stout bolts passing through both; this cross bar serves as a brace to the arms and with them forms the saw frame; E, a light straight bar placed across the end of the trestle for the arms C to rest on in order to steady the frame when operating, its principal use however is in first starting the saw to steady it until it has cut in some distance, it may then be removed.

$g$ is the saw, which is curved in the center, this curve is a segment of a circle whose radius is a line drawn from the fulcrum to the point of the teeth; $h$, a dog fastened to the trestle, the point of the hook driven into the tree, there are two of the these, securing the trestle on both sides.

Now to operate with the machine, place your trestle on the side of a tree opposite to the direction you wish it to fall, place the proper height from the ground, drive in the dowel pin fasten the dogs, place the saw frame in its proper place, slide the saw through the slots made for it in the arms, by now pressing these together, you can strain your saw, by putting keys through the holes and letting the arms slack, they will thus press against the keys and strain the saw, now, draw up your strap attached to the spring I, hook it on the pin in the block B, you are now ready to operate.

What I claim as new and desire to secure by Letters Patent is—

The method of straining the saw by means of the curved elastic arms C, C, and the adjustable bar D as above.

E. MATHERS.

Witneses:
    JOSEPH R. MATHERS,
    GEORGE HAWTHORN.